United States Patent
Slater et al.

[15] 3,706,217
[45] Dec. 19, 1972

[54] ACCELEROMETER

[72] Inventors: John M. Slater, Fullerton; Doyle E. Wilcox, Hacienda Heights, both of Calif.

[73] Assignee: North American Rockwell Corporation

[22] Filed: June 10, 1970

[21] Appl. No.: 44,967

[52] U.S. Cl. ..............................73/497, 73/516 LM
[51] Int. Cl. .............................................G01p 15/08
[58] Field of Search..............................73/497, 516

[56] References Cited

UNITED STATES PATENTS

| | | | |
|---|---|---|---|
| 3,221,563 | 12/1965 | Wing | 73/516 |
| 3,270,565 | 9/1966 | Hawley et al. | 73/497 |
| 2,963,285 | 12/1960 | Fischer et al. | 73/516 |
| 3,080,761 | 3/1963 | Speen | 73/516 |
| 3,167,962 | 2/1965 | Scotto | 73/515 |
| 3,178,937 | 4/1965 | Bradley | 73/141 |

*Primary Examiner*—Richard C. Queisser
*Assistant Examiner*—Herbert Goldstein
*Attorney*—L. Lee Humphries, H. Fredrick Hamann and Edward Dugas

[57] ABSTRACT

The invention is directed to a three-axes translational, digital accelerometer, comprising a proof mass contained within a cavity which closely surrounds the proof mass with a dampening liquid filling the space between the proof mass and the inner walls of the cavity. The proof mass is constructed and arranged to have a cubical coefficient of expansion substantially the same as that of the dampening liquid so as to minimize any temperature-dependent scale factor changes. Means are provided for detecting departure of the proof mass from a null position within the cavity under the influence of an acceleration force. Additional means are provided which are responsive to the detected departure of the proof mass from a null position which means are used to force the proof mass towards the null position such that the amount of force required is directly proportional to the acceleration sensed by the proof mass.

4 Claims, 10 Drawing Figures

INVENTORS
JOHN M. SLATER
DOYLE E. WILCOX
BY Edward Dugas
ATTORNEY

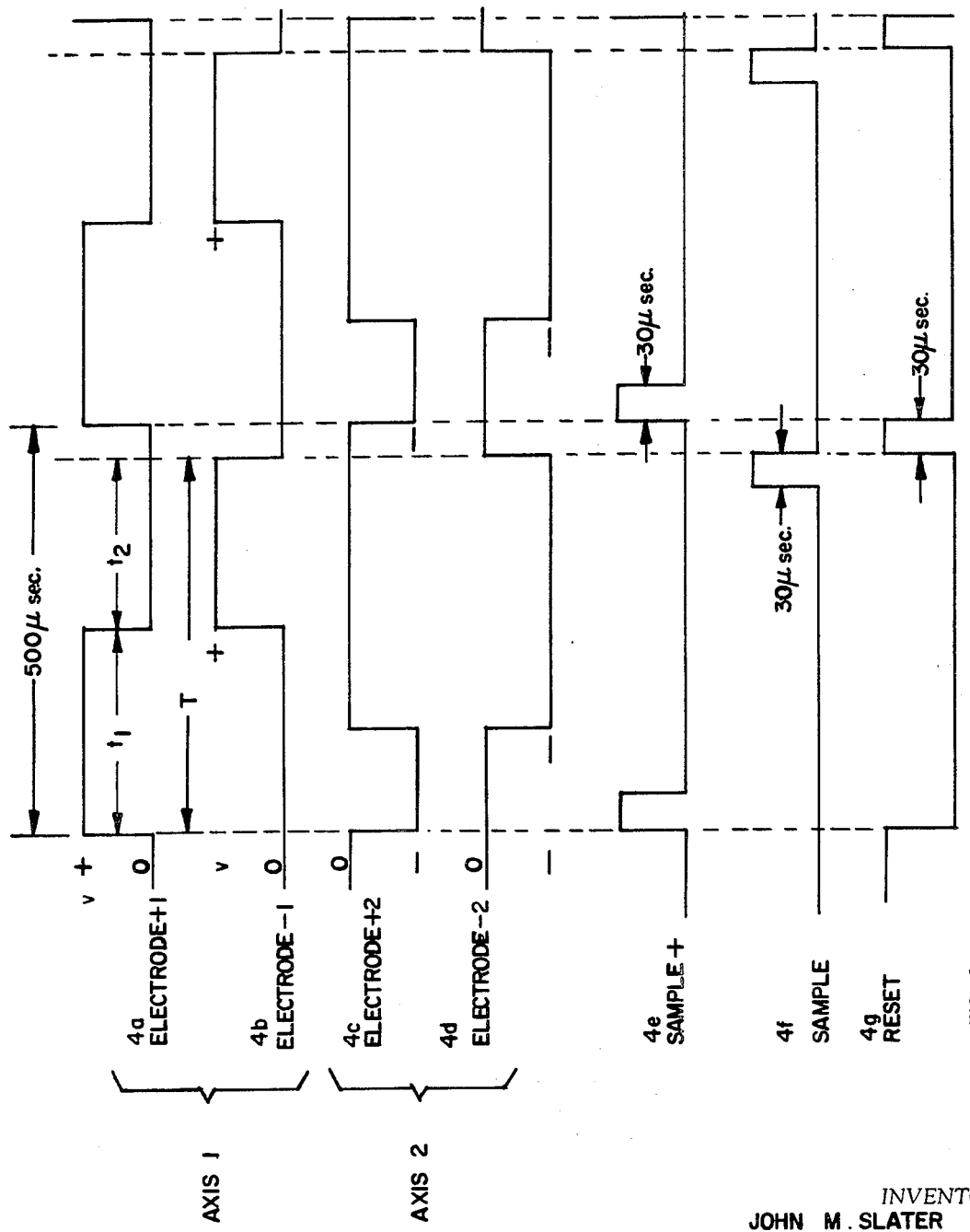

ACCELEROMETER

BACKGROUND OF THE INVENTION

The field of the invention is in translational accelerometers for use in flight instrumentation and control systems, and more particularly in an instrument for measuring components of acceleration along three orthogonal axes.

In flight control (autopilots) and in inertial navigation, there exists a requirement for instruments to measure components of total craft acceleration along two or three mutually perpendicular axes. Acceleration signals can be processed in a computer in conjunction with gyro-reference signals to yield attitude and heading angle information, and also, in inertial navigation systems, positional and course information. For some types of systems digital acceleration signals are required, as the necessary computations are best performed by a digital computer. Three separate accelerometers can be used, but there are advantages in providing a single instrument with three outputs. So-called three-axis accelerometers are the subject of many patents, including the following:

U. S. Pat. No. 3,000,221, "Control Apparatus", by Leonard P. Entin;

U. S. Pat. No. 3,117,456, "Accelerometers", by Willis G. Wing;

U. S. Pat. No. 3,147,625, "Hydraulic Accelerometers" by Robert N. Green

U. S. Pat. No. 3,272,016, "Three Axis Accelerometer" by Wm. D. Mullins, Jr.

U. S. Pat. No. 3,304,787, "Three Dimensional Accelerometer Device" By Takewo Chiku All of these patented instruments are rather complex mechanically. A particularly attractive instrument, from the point of view of mechanical simplicity and ruggedness, would make use of a spherical proof mass (i.e. mass or body which senses acceleration) with a set of three orthogonal pickoffs to detect departure of the mass from null under acceleration, and three forcers or levitators, under control of the pickoffs, for restoring the null, the required force being taken as a measure of acceleration. Such an instrument presents practical problems, however, especially in the electronics. Assuming that electrostatic pickoff and forcing systems are used, the gap between the sphere and the electrodes must be small to make the voltages required as small as possible. In a digital electronic system this means that the operating frequencies must be quite high. That is, the sphere must be allowed to displaced only a very small distance before a forcing pulse is generated to urge it back toward null. Furthermore, effective electronic damping must be supplied if the sphere is installed in an evacuated or gas-filled cavity. Similar complications are encountered if electromagnetic pickoff and forcing means are used instead of electrostatic means.

SUMMARY OF THE INVENTION

In the preferred embodiment of the invention there is provided a spherical proof mass which is encased in a cavity closely surrounding the proof mass. A damping liquid fills the space between the proof mass and the cavity. Means are provided for detecting departure of the proof mass from a null position under the influence of acceleration. Means are also provided for restoring the proof mass to the null position. The proof mass is constructed and arrayed to have a cubical coefficient of expansion substantially equal to the damping liquid.

Among the objects of the invention are the following:

To provide a three-axis accelerometer with viscous liquid damping, to alleviate some of the electronics problems, in an arrangement such as to avoid temperature-dependent scale factor errors due to variation in liquid density.

To provide a three-axis accelerometer including a liquid-immersed proof mass of such construction as to change in effective volume in substantially the same manner as the cubical coefficient of expansion of the immersion liquid, to eliminate temperature dependent scale factor errors.

To provide an accelerometer of electrostatically restored type, with a simplified electronics circuit made possible by the provision of liquid damping while avoiding temperature-dependent scale factor errors.

According to the invention, we provide a spherical proof mass of construction to be described, contained in a closely surrounding spherical cavity fitted with electrodes. Pickoff circuits detect departure of the proof mass from null, along any of three orthogonal axes, and energize forcers or levitators to urge the proof mass toward null. The forcer circuits are digital in character, and the output is a pulse train of frequency proportional to acceleration along a given axis. The space between the proof mass and the cavity is filled with liquid, for damping purposes. Practical liquids all have finite cubical coefficients of expansion. Accordingly, in the case of a simple spherical body the effective mass would tend to increase with temperature. This would result in a temperature-dependent scale factor error. We avoid this by making the proof mass of expansible construction, and providing that its effective cubical coefficient of expansion matches that of the immersion liquid. The simplest way to conceive of the proof mass is as a thin-walled hollow spherical shell, made of an expansible plastic material such as teflon or mylar, having a very thin layer (a few microinches) of metal for conductivity, and containing a liquid of the same cubical coefficient of expansion as that of the immersing liquid, but a different density. Then as temperature increases, the spherical proof mass will expand at exactly the same rate as the immersing liquid, and the net effective mass will remain constant. In practice, it is usually more convenient to provide a thin, open spherical shell in which is fitted a flexible metal bellows containing the different-density liquid.

These and other objects of the present invention will become more apparent and better understood when taken in conjunction with the following description and accompanying drawings, throughout which like characters indicate like parts and which drawings form a part of this application.

BRIEF DESCRIPTION OF THE DRAWINGS

FIGS. 4a to 4g are waveforms taken at points in the circuit of FIG. 3.

DESCRIPTION OF THE PREFERRED EMBODIMENT

Figure 1:
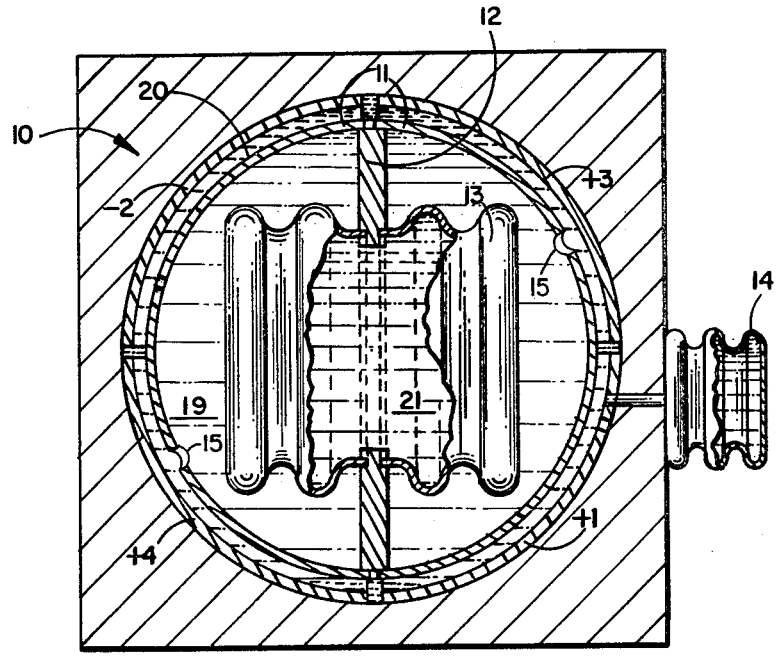
FIG. 1 is a view of the accelerometer in cross section.

Referring to FIG. 1, a case 10 of nonmetallic material such as ceramic, contains a set of eight quadrantal electrodes, labeled: +1, −1; +2, −2; +3, −3; and +4, −4; defining a spherical cavity. Within the cavity is disposed a solid surfaced spherical proof mass 20 comprising hemispherical shells 11, disc 12 and bellows 13. An expansion bellows 14 is connected to the gap between the electrodes and the sphere. The disc 12 supports the bellows 13 within the sphere 20. Typically the diameter of the proof mass 20 will be 1 or 2 cm and the thickness of the metal parts (shown exaggerated for clarity), 0.1 mm or less. The material of construction may be beryllium, magnesium, aluminum, etc. A liquid 19 fills the gap between the sphere and the electrodes and the expansion bellows 14 and the interior of the proof mass except for the bellows 13. A path for the fluid 19 into sphere 20 is provided by ports 15. The bellows 13 is filled with a liquid 21 of the same cubical expansion coefficient as the immersal liquid but of markedly different density, either higher or lower. For the immersion liquid 19, we ordinarily use a fluorester, or polymers of trifluororinyl chloride sold under the registered trade name Fluorolube (Hooker Electrochemical Company). Data on two grades of Fluorolube is as follows:

|  | FS | S |
|---|---|---|
| Density at 38°C: | 1.868 | 1.930 |
| Cubical Coefficient of Expansion, per °C: | | |
| 25°C: | $0.850 \times 10^{-3}$ | $0.810 \times 10^{-3}$ |
| 50°C: | 0.865 | 0.830 |
| 75°C: | 0.880 | 0.850 |

Fluoresters have closely similar properties.

For the liquid 21 contained within the bellows 13, a wide choice is available. An anhydrous mixture of glycerol and ethyl alcohol can be prepared which has a density slightly over unity and which matches the cubical coefficient of expansion of Fluorolube or fluorester as closely as desired at a given temperature. Similarly, a petroleum fraction can be selected which has a density slightly less than unity and which matches the coefficient of Fluorolube or fluoroester as closely as desired at a given temperature. The cubical expansion coefficient of liquids is not strictly a constant, as is apparent from the data for Fluorolube given above. It increases slightly with temperature, as is indicated in the conventional expression for the volume $V_t$ of a liquid at a given temperature compared to its volume $V_o$ at 0° C:

$$V_t = V_o (1 \times \alpha CT + \beta t^2 + \gamma t^3 \ldots)$$

In general, $\alpha$ is of the order of $10^{-3}$, $\beta$ of $10^{-6}$ and $\gamma$ of $10^{-8}$. (If the coefficient of cubical expansion were truly a constant, the terms in $\beta$ and higher would be zero.) However, it is sufficient for the purposes of the present invention if the non-linearity of the two liquids be substantially the same. This condition is approximately true in the case of the liquids specified. Using sufficiently thin parts, the total displaced volume of the metal parts of the proof mass is ordinarily negligible compared to the volume of the liquid. If it is not negligible, the expansion coefficient of the liquid 21 in the bellows can be made slightly higher than that of the immersion liquid 19 to compensate for the inexpansibility of the metal.

Figure 2:
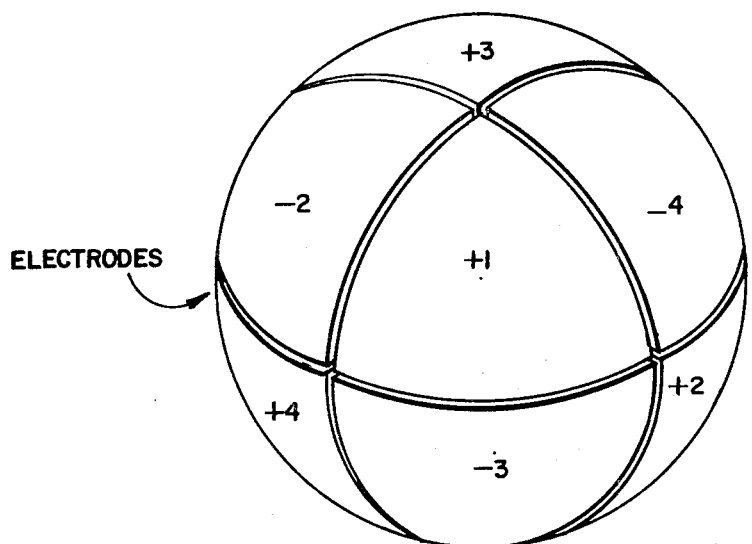
FIG. 2 is a diagram showing the electrode arrangement.
Figure 3:
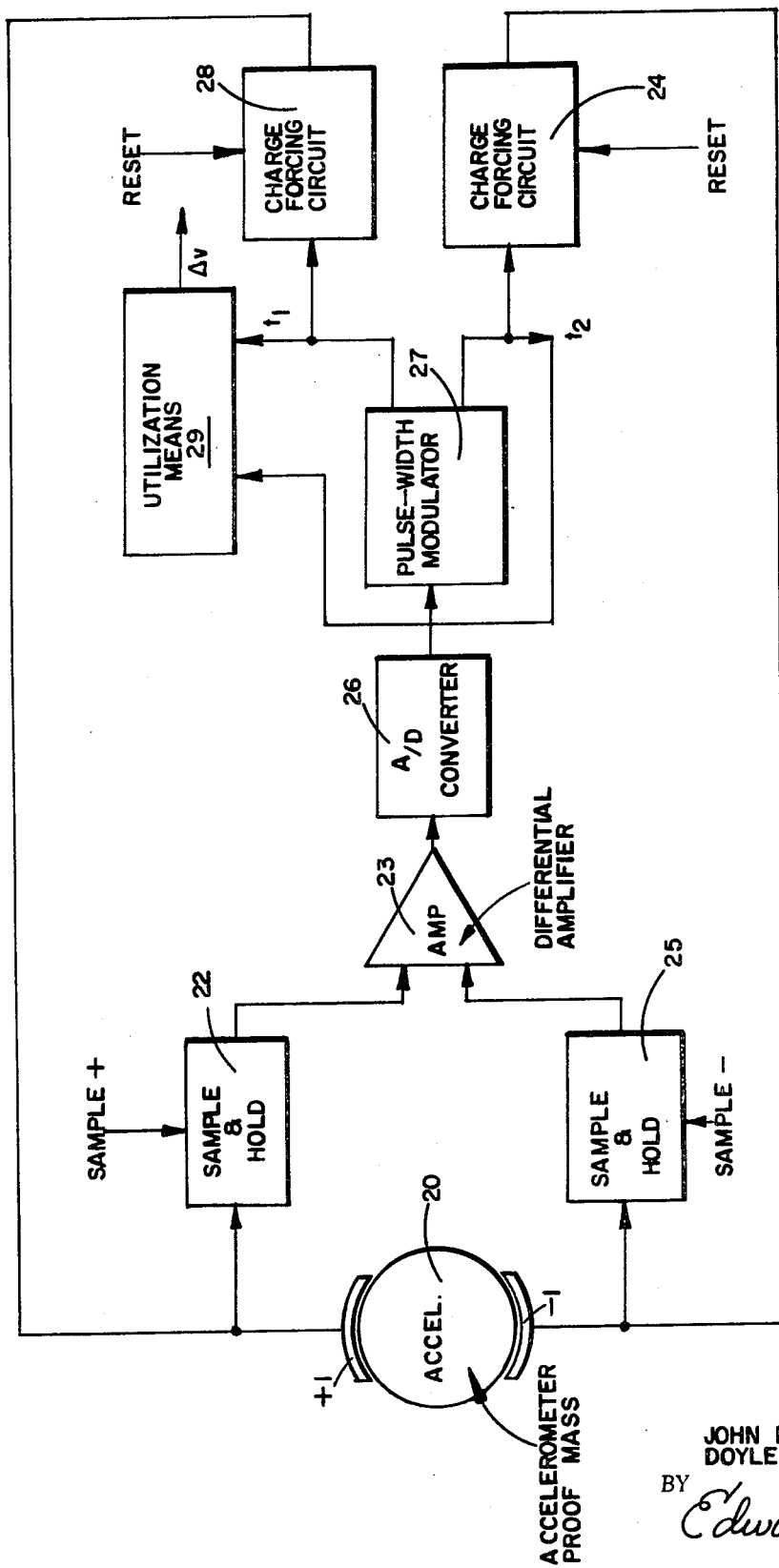
FIG. 3 is a circuit schematic diagram of the electronics used with the accelerometer of FIG. 1.

We now turn to the electrical circuit for the accelerometer shown in FIG. 3; and utilizing the electrodes of FIG. 2. Although other arrangements are feasible, e.g., use of three pairs of electrodes (six in all), an optimum digital electrostatic forcing means for constraining the proof body centrally within the flotation cavity would utilize an octahedral pattern of forcing plates within the spherical flotation cavity. The octahedral pattern of forcing plates constitutes a four-axis forcing system. The direction of each force axis is along the line of the net force vector developed by diametrically opposite plates, such as plates labeled +1, −1, and +2, −2, etc. The force signals from this four-axis system may then be converted into an orthogonal three-axis system within a computer.

The digital forcing method is preferred for this type of instrument because it used periodic application of a precise electrical charge $q$ to each of four of the eight electrodes (plates) while keeping the remaining four electrodes at ground potential. At an instant of time after application of this charge, as determined by the individual force axis servos, the precise charge will be removed from the electrodes to which it was applied at the beginning of the forcing period and applied to the opposite electrode on the same force axis, the first electrode being then grounded for the remainder of the forcing period. Near the end of the forcing period, all the electrodes are connected to ground for a short reset-time interval.

FIG. 3 is a block diagram showing one set of electronics for controlling one pair of electrostatic forcing electrodes; +1 and −1; the electronic functions associated with each pair of electrodes is identical to the one shown. For example, associating this particular circuit with the +1 and −1 electrode pair and referring to the waveforms of FIGS. 4a and 4b, the charge forcing circuit 28 will apply a precise charge of magnitude $q$ to plate +1 at time $t = 0$, resulting in a voltage $v$ on electrode +1. This voltage is sampled by the sample and hold circuit 22 in response to the periodic sample signals shown in FIG. 4e, which will maintain this voltage at one input terminal of differential amplifier 23 until the next sampling period. The magnitude of this voltage will be proportioned to the gap between electrode +1 and the proof body 20. At the end of time period $t$, the pulse width modulator 27 will command the removal of the charge $q$ from electrode +1 and will apply the charge 2 to electrode −1. At the end of time interval $t_2$ the sample and hold circuit 25, in response to the periodic sample signal shown in FIG. 4f, will apply the voltage existing on electrode −1 to the differential amplifier 23. The result is that the output for amplifier 23, which is applied to the A/D converter 26 is a voltage proportional to the difference between the gaps existing between the proof body 20 and electrodes +1 and −1. The A/D converter 26 converts this voltage into a digital equivalent so that the pulse width modulator 27 will adjust the relative values of $t_1$ and $t_2$ such as to restore the proof body to a centered position between electrodes +1 and −1. The output values, $t_1$ and $t_2$ are then fed to a utilization means 29 which may be a computer where the difference $t_1 - t_2$ is determined so that the velocity charge $\Delta v$ accumulated over the time interval $T$, may be computed in accordance with the equation $\Delta v = G_o(t_1 - t_2)$.

The circuit of FIG. 3 is typical of the levitation circuits applicable to each of the four pairs of electrodes. A reset signal, shown in FIG. 4g is applied to the charge forcing circuits 24 and 28 to set their outputs at a 0 potential. The circuit details of the various functional boxes 22 thru 28 are well known to those skilled in the art and are not the subject of this invention. FIGS. 4c and 4d illustrate the waveforms existing on electrodes +2 and −2 in relation to the waveforms on electrodes +1 and −1.

While there has been disclosed what is considered to be the preferred embodiment of the invention, it will be manifest that many changes and modifications may be made therein without departing from the essential spirit of the invention.

We claim:

1. An accelerometer comprising in combination:
   a solid surfaced movable proof mass;
   a cavity closely surrounding said proof mass;
   means for detecting departure of said proof mass from a null position under the influence of acceleration;
   means responsive to said detecting means for forcing said proof mass towards the null position; and
   damping liquid filling the space between the said proof mass and said cavity wall, said proof mass being constructed and arranged to have a cubical coefficient of expansion substantially the same as that of the damping liquid so as to minimize any temperature-dependent scale factor change.

2. The accelerometer according to claim 1 wherein said proof mass is hollow and has at least one opening therethru for providing a fluid path, a bellows means mounted within said proof mass and containing a second liquid having the same cubical coefficient of expansion as the first named liquid with a different density.

3. A three-axis translational accelerometer comprising in combination:
   a cavity containing a liquid;
   a solid surfaced spherical proof mass submerged in said liquid, said proof mass having a cubical coefficient of expansion substantially the same as that of said liquid; and
   means for detecting displacement of said proof mass along three orthogonal axes.

4. The accelerometer according to claim 3 wherein said spherical proof mass is hollow and has at least one opening therethru for providing a fluid path, a bellows means mounted within said sphere and containing a second liquid having the same cubical coefficient of expansion as the first named liquid with a different density.

* * * * *